(12) United States Patent
He et al.

(10) Patent No.: US 12,215,816 B2
(45) Date of Patent: Feb. 4, 2025

(54) ONE-TIME PUNCH FORMED ALUMINUM HOSE WHOSE HEAD CAN BE BROKEN AND USED AS PLUG

(71) Applicant: GOLD FORTUNE (GUANGDONG) IMPORT & EXPORT CO., LTD, Foshan (CN)

(72) Inventors: Liang He, Foshan (CN); Jianyi Huang, Foshan (CN)

(73) Assignee: GOLD FORTUNE (GUANGDONG) IMPORT & EXPORT CO., LTD, Foshan (CN)

( * ) Notice: Subject to any disclaimer, the term of this patent is extended or adjusted under 35 U.S.C. 154(b) by 169 days.

(21) Appl. No.: 17/830,355

(22) Filed: Jun. 2, 2022

(65) Prior Publication Data

US 2022/0290792 A1  Sep. 15, 2022

(51) Int. Cl.
*F16L 55/11* (2006.01)
*B65D 17/40* (2006.01)

(52) U.S. Cl.
CPC .............. *F16L 55/11* (2013.01); *B65D 17/40* (2018.01); *B65D 2517/0038* (2013.01)

(58) Field of Classification Search
CPC ........... B67B 2007/047; B67B 3/2066; B65D 2517/0043; B65D 2517/0038; B65D 17/462; B65D 17/44; B65D 17/40; B65D 17/401; B65D 17/4014; B65D 17/42; F16L 55/124; F16L 55/1286

USPC ................... 220/276; 401/269; 215/252–253
See application file for complete search history.

(56) References Cited

U.S. PATENT DOCUMENTS

| | | | | |
|---|---|---|---|---|
| 7,431,529 | B1 * | 10/2008 | Rushe | B65D 1/0238 401/133 |
| 2003/0127472 | A1 * | 7/2003 | Doherty | B65D 1/095 222/541.5 |
| 2006/0266727 | A1 * | 11/2006 | Spatz | B67B 3/12 215/252 |
| 2013/0105021 | A1 * | 5/2013 | Sridhar | B65D 1/095 138/89 |
| 2013/0233898 | A1 * | 9/2013 | Resnikoff | B65D 43/0202 222/568 |

* cited by examiner

*Primary Examiner* — Anthony D Stashick
*Assistant Examiner* — Raven Collins

(57) ABSTRACT

What the present invention discloses belongs to the technical field of aluminum hoses, and in particular relates to a one-time punch formed aluminum hose whose head can be broken and used as a plug. A broken part is provided between an extrusion head and a plugging head, so that the connection between the extrusion head and the plugging head is relatively "fragile". A user breaks the broken part to realize the separation of the plugging head from the extrusion head, and at the same time, the other end of the plugging head is inserted into an extrusion port and is in an interference fit with the extrusion port, thus achieving the effect of plugging.

6 Claims, 4 Drawing Sheets

ONE-TIME PUNCH FORMED ALUMINUM HOSE WHOSE HEAD CAN BE BROKEN AND USED AS PLUG

TECHNICAL FIELD

The present invention relates to the technical field of aluminum hoses, and in particular to a one-time punch formed aluminum hose whose head can be broken and used as a plug.

BACKGROUND

At present, environmental protection is the main trend of packaging in the world. Many developed countries in Europe and the United States have begun to ban or restrict the use of plastic packaging products. In this context, aluminum hoses have received unprecedented attention and popularity as natural recyclable packaging. However, traditional aluminum hoses all need a plastic cover to play a sealing role, and the plastic covers will become impurities when the aluminum tubes are recycled and smelted, which also affects the quality of secondary smelting of aluminum while polluting the environment. Although there are aluminum tube covers made of pure aluminum on the market now, it is difficult to achieve large-scale promotion due to the high price (the price of a cover is usually twice the price of the aluminum tube itself, while the aluminum tube is originally the main body, and the cover is only an accessory).

SUMMARY

In view of the problems in the existing one-time punch formed aluminum hose whose head can be broken and used as a plug, the present invention is proposed.

Therefore, the purpose of the present invention is to provide a one-time punch formed aluminum hose whose head can be broken and used as a plug, which solves the problems that traditional aluminum hoses all need a plastic cover to play a sealing role, and the plastic covers will become impurities when the aluminum tubes are recycled and smelted, which also affects the quality of secondary smelting of aluminum while polluting the environment, and although there are aluminum tube covers made of pure aluminum on the market now, it is difficult to achieve large-scale promotion due to the high price.

In order to solve the above-mentioned technical problems, according to one aspect of the present invention, the present invention provides the following technical solutions:

A one-time punch formed aluminum hose whose head can be broken and used as a plug, including an aluminum hose, where one end of the aluminum hose is sequentially provided with an extrusion head and a plugging head, and a broken part is provided between the extrusion head and the plugging head, where the end of the extrusion head facing the plugging head is provided with an extrusion port, the end of the plugging head away from the extrusion head can be in an interference fit with the extrusion port, and where the extrusion head, the broken part and the plugging head are all integrally formed with the aluminum hose.

As a preferred solution of the one-time punch formed aluminum hose whose head can be broken and used as a plug of the present invention, the plugging head includes a plugging cylinder and a plugging disk, which are connected in sequence, with the plugging cylinder being integrally formed at the upper end of the plugging disk, and the broken part being integrally formed at the lower end of the plugging disk.

As a preferred solution of the one-time punch formed aluminum hose whose head can be broken and used as a plug of the present invention, the outer diameter of the plugging cylinder progressively increases from the direction close to the plugging disk.

As a preferred solution of the one-time punch formed aluminum hose whose head can be broken and used as a plug of the present invention, the outer side wall of the plugging cylinder is provided with several circles of anti-slip patterns.

As a preferred solution of the one-time punch formed aluminum hose whose head can be broken and used as a plug of the present invention, the aluminum hose is of a cylindrical tubular structure, and the end of the aluminum hose away from the extrusion head is provided with a hollow structure shape of a feed port.

As a preferred solution of the one-time punch formed aluminum hose whose head can be broken and used as a plug of the present invention, the wall thickness of the aluminum hose is uniform, and the aluminum hose is made of aluminum.

As a preferred solution of the one-time punch formed aluminum hose whose head can be broken and used as a plug of the present invention, the end of the plugging disk away from the plugging cylinder is defined with a weight reduction groove.

As a preferred solution of the one-time punch formed aluminum hose whose head can be broken and used as a plug of the present invention, the broken part is of an annular tubular structure, with the upper end of the annular tubular structure being integrally formed with the bottom of the plugging disk, and the lower end of the annular tubular structure being integrally formed with the extrusion head.

As a preferred solution of the one-time punch formed aluminum hose whose head can be broken and used as a plug of the present invention, the outer diameter of the annular tubular structure is less than that of the plugging disk and the extrusion head.

As a preferred solution of the one-time punch formed aluminum hose whose head can be broken and used as a plug of the present invention, the value of the inner diameter of the extrusion port ranges from the maximum value of the outer diameter of the plugging cylinder to the minimum value of the outer diameter of the plugging cylinder.

The beneficial effects are: a broken part is provided between an extrusion head and a plugging head, so that the connection between the extrusion head and the plugging head is relatively "fragile"; a user breaks the broken part to realize the separation of the plugging head from the extrusion head, and at the same time, the other end of the plugging head is inserted into an extrusion port and is in an interference fit with the extrusion port, thus achieving the effect of plugging; since the extrusion head, the broken part and the plugging head are all integrally formed with the aluminum hose, the preparation is simpler and the cost is lower; and in addition, not only can repeated use be realized, but it is easy to use and the cost of use is effectively reduced.

Figure 1:
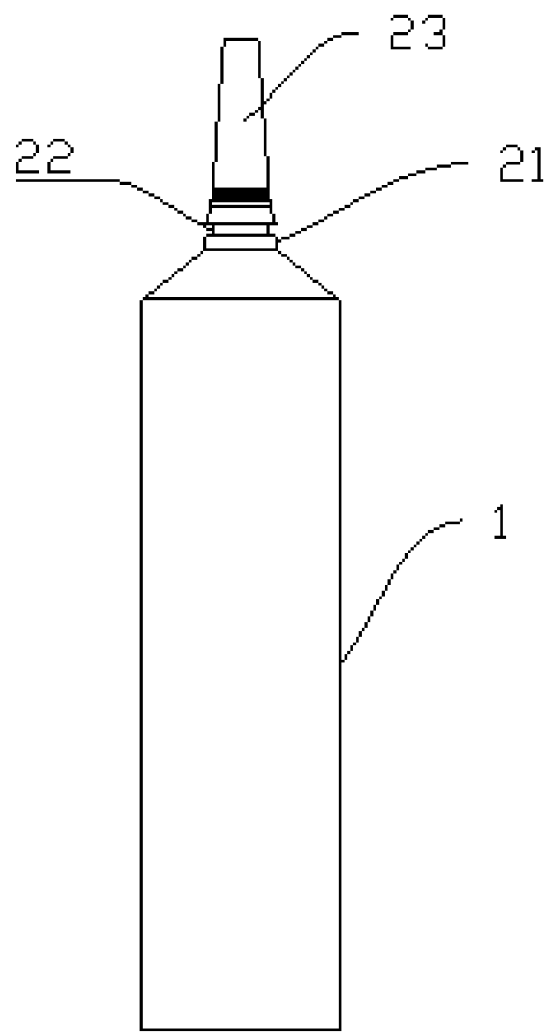
FIG. 1 is a schematic structural diagram of the one-time punch formed aluminum hose provided by the present invention.
Figure 2:
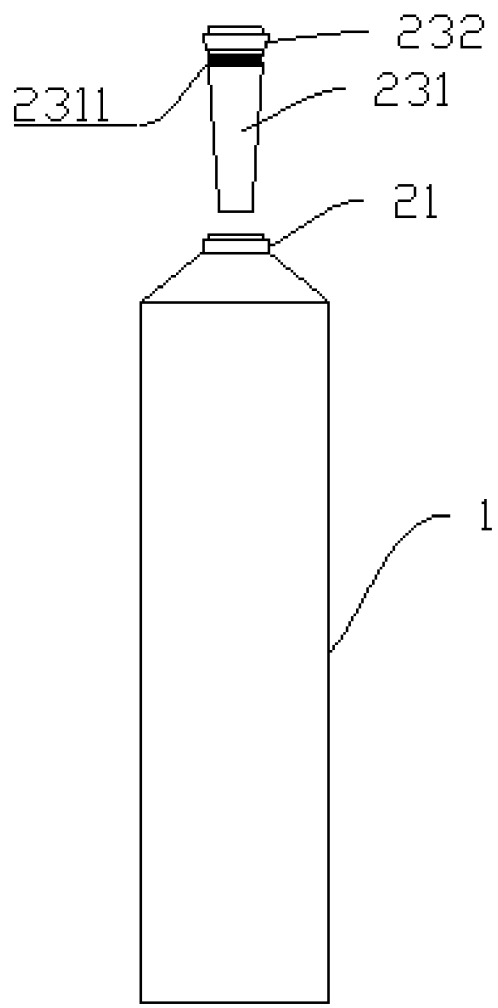
FIG. 2 is a schematic diagram before the plugging head and the extrusion head of the present invention are assembled.
Figure 3:
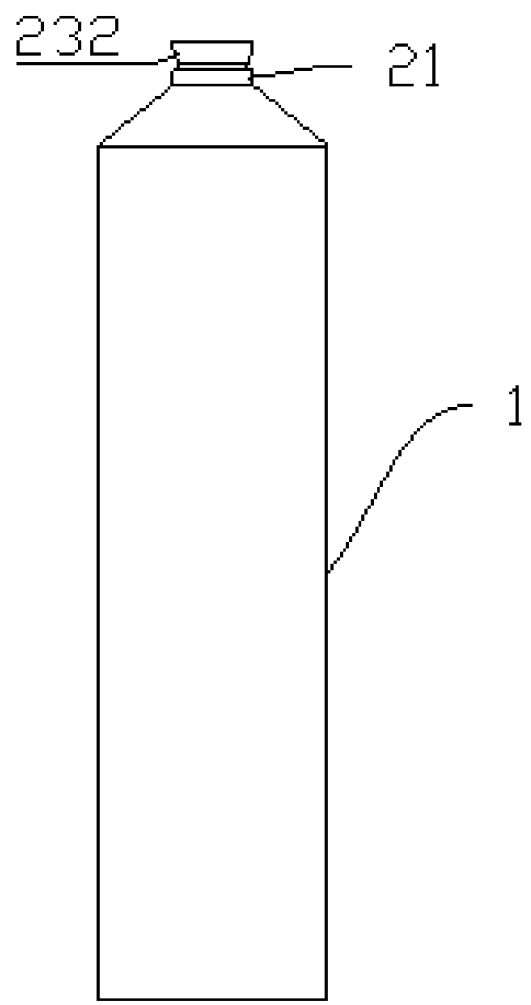
FIG. 3 is a schematic diagram before the plugging head and the extrusion head of the present invention are assembled.
Figure 4:
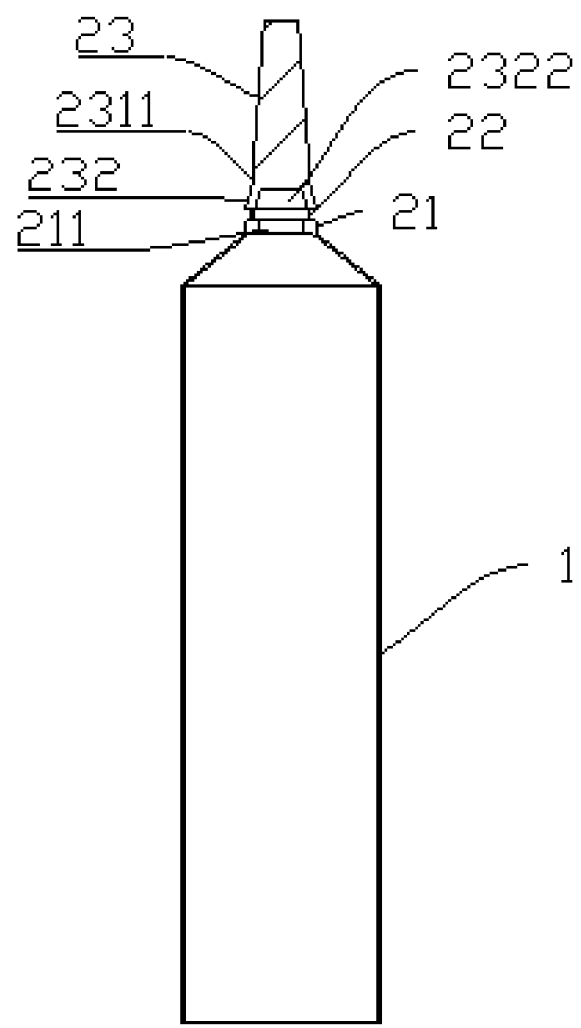
FIG. 4 is a cross-sectional view of the one-time punch formed aluminum hose according to the present invention.

In the figures: Aluminum Hose 1, Extrusion Head 21, Broken Part 22, Plugging Head 23, Plugging Cylinder 231, Plugging Disk 232, Anti-slip Pattern 2311, and Weight Reduction Groove 2322.

DETAILED DESCRIPTION

In order to make the objects, technical solutions and advantages of the present invention clearer, the embodiments of the present invention will be described in further detail below in conjunction with the accompanying drawings.

A one-time punch formed aluminum hose whose head can be broken and used as a plug, including an aluminum hose 1, where one end of the aluminum hose 1 is sequentially provided with an extrusion head 21 and a plugging head 23, and a broken part 22 is provided between the extrusion head 21 and the plugging head 23, where the end of the extrusion head 21 facing the plugging head 23 is provided with an extrusion port, the end of the plugging head 23 away from the extrusion head 21 can be in an interference fit with the extrusion port, and where the extrusion head 21, the broken part 22 and the plugging head 23 are all integrally formed with the aluminum hose 1.

A broken part 22 is provided between the extrusion head 21 and the plugging head 23, so that the connection between the extrusion head 21 and the plugging head 23 is relatively "fragile". A user breaks the broken part 22 to realize the separation of the plugging head 23 from the extrusion head 21, and at the same time, the other end of the plugging head 23 is inserted into an extrusion port and is in an interference fit with the extrusion port, thus achieving the effect of plugging. Since the extrusion head 21, the broken part 22 and the plugging head 23 are all integrally formed with the aluminum hose 1, the preparation is simpler and the cost is lower. In addition, not only can repeated use be realized, but it is easy to use and the cost of use is effectively reduced.

As a preferred solution of the one-time punch formed aluminum hose 1 whose head can be broken and used as a plug of the present invention, the plugging head 23 includes a plugging cylinder 231 and a plugging disk 232, which are connected in sequence, with the plugging cylinder 231 being integrally formed at the upper end of the plugging disk 232, and the broken part 22 being integrally formed at the lower end of the plugging disk 232. In the present specific embodiment, the plugging cylinder 231 is of a solid structure, which can ensure its strength and prevent from being unable to plug at the extrusion port due to deformation by force.

As a preferred solution of the one-time punch formed aluminum hose 1 whose head can be broken and used as a plug of the present invention, the outer diameter of the plugging cylinder 231 progressively increases from the direction close to the plugging disk 232. The outer diameter of the plugging cylinder 231 progressively increasing from the direction close to the plugging disk 232 can ensure that the plugging cylinder 231 can pass through the extrusion port smoothly at the beginning. With the progressive increase of the plugging cylinder 231, the plugging cylinder 231 can be in an interference fit with the extrusion port to ensure the stability of assembly of both.

As a preferred solution of the one-time punch formed aluminum hose 1 whose head can be broken and used as a plug of the present invention, the outer side wall of the plugging cylinder 231 is provided with several circles of anti-slip patterns 2311. The plugging cylinder 231 is inserted back of the extrusion outlet to avoid falling off between the two.

As a preferred solution of the one-time punch formed aluminum hose 1 whose head can be broken and used as a plug of the present invention, the aluminum hose 1 is of a cylindrical tubular structure, and the end of the aluminum hose 1 away from the extrusion head 21 is provided with a hollow structure shape of a feed port, so as to use a cavity to contain the product. When the product is filled, the feed port can be rewound by pressing and folding same.

As a preferred solution of the one-time punch formed aluminum hose 1 whose head can be broken and used as a plug of the present invention, the wall thickness of the aluminum hose 1 is uniform, and the aluminum hose 1 is made of aluminum. The wall thickness of the aluminum hose 1 being uniform and the aluminum hose 1 being made of aluminum are in line with existing packaging needs for packaging products.

As a preferred solution of the one-time punch formed aluminum hose 1 whose head can be broken and used as a plug of the present invention, the end of the plugging disk 232 away from the plugging cylinder 231 is defined with a weight reduction groove 2322. The weight reduction groove 2322 can reduce the weight of the plugging head 23, thereby reducing the overall weight of the aluminum hose 1, and on the other hand, saving materials and reducing costs.

As a preferred solution of the one-time punch formed aluminum hose 1 whose head can be broken and used as a plug of the present invention, the broken part 22 is of an annular tubular structure, with the upper end of the annular tubular structure being integrally formed with the bottom of the plugging disk 232, and the lower end of the annular tubular structure being integrally formed with the extrusion head 21.

As a preferred solution of the one-time punch formed aluminum hose 1 whose head can be broken and used as a plug of the present invention, the outer diameter of the annular tubular structure is less than that of the plugging disk 232 and the extrusion head 21.

In specific use, under the action of the annular tube structure, the connection between the extrusion head 21 and the plugging head 23 is relatively "fragile". The plugging head 23 is broken by force, so that the product can be placed at the extrusion port for extrusion. The plugging cylinder 231 of the plugging head 23 is inserted into the extrusion port of the aluminum hose 1.

As a preferred solution of the one-time punch formed aluminum hose 1 whose head can be broken and used as a plug of the present invention, the value of the inner diameter of the extrusion port ranges from the maximum value of the outer diameter of the plugging cylinder 231 to the minimum value of the outer diameter of the plugging cylinder 231. The outer diameter of the plugging cylinder 231 progressively increasing from the direction close to the plugging disk 232 can ensure that the plugging cylinder 231 can pass through the extrusion port smoothly at the beginning. With the progressive increase of the plugging cylinder 231, the plugging cylinder 231 can be in an interference fit with the extrusion port to ensure the stability of assembly of both.

Although the present invention has been described above with reference to the embodiments, various modifications can be made thereto and components therein can be replaced with equivalents without departing from the scope of the present invention. In particular, as long as there is no structural conflict, various features in the disclosed embodiments of the present invention can be used in combination with each other in any way, and the case where these combinations are not exhaustively described in the present description is only for considerations for omitting space and saving resources. Therefore, the present invention is not limited to the specific embodiments disclosed herein, but includes all technical solutions that fall within the scope of the claims.

The invention claimed is:

1. A one-time punch formed aluminum hose whose head can be broken and used as a plug, comprising an aluminum hose, wherein one end of the aluminum hose is sequentially provided with an extrusion head and a plugging head, and a broken part is provided between the extrusion head and the plugging head, wherein the end of the extrusion head facing the plugging head is provided with an extrusion port, the end of the plugging head away from the extrusion head can be in an interference fit with the extrusion port, and wherein the extrusion head, the broken part and the plugging head are all integrally formed with the aluminum hose;

wherein the plugging head comprises a plugging cylinder and a plugging disk, which are connected in sequence, with the plugging cylinder being integrally formed at the upper end of the plugging disk, and the broken part being integrally formed at the lower end of the plugging disk;

wherein the outer diameter of the plugging cylinder progressively increases from the direction close to the plugging disk;

wherein the end of the plugging disk away from the plugging cylinder is defined with a weight reduction groove; and wherein the broken part is of an annular tubular structure, with the upper end of the annular tubular structure being integrally formed with the bottom of the plugging disk, and the lower end of the annular tubular structure being integrally formed with the extrusion head.

2. The one-time punch formed aluminum hose whose head can be broken and used as a plug of claim 1, wherein the outer side wall of the plugging cylinder is provided with several circles of anti-slip patterns.

3. The one-time punch formed aluminum hose whose head can be broken and used as a plug of claim 1, wherein the aluminum hose is of a cylindrical tubular structure, and the end of the aluminum hose away from the extrusion head is provided with a hollow structure shape of a feed port.

4. The one-time punch formed aluminum hose whose head can be broken and used as a plug of claim 3, wherein the wall thickness of the aluminum hose is uniform, and the aluminum hose is made of aluminum.

5. The one-time punch formed aluminum hose whose head can be broken and used as a plug of claim 1, wherein the outer diameter of the annular tubular structure is less than that of the plugging disk and the extrusion head.

6. The one-time punch formed aluminum hose whose head can be broken and used as a plug of claim 1, wherein the value of the inner diameter of the extrusion port ranges from the maximum value of the outer diameter of the plugging cylinder to the minimum value of the outer diameter of the plugging cylinder.

* * * * *